United States Patent Office 3,274,181
Patented Sept. 20, 1966

3,274,181
PROCESS FOR OXYGENATION OF ORGANIC COMPOUNDS
Christopher S. Foote and Sol Wexler, Los Angeles, Calif., assignors to The Regents of The University of California, a corporation of California
No Drawing. Filed Sept. 18, 1964, Ser. No. 397,602
12 Claims. (Cl. 260—239.55)

This invention relates to a process for producing organic compounds. In particular, this invention relates to a novel process for oxygenating certain organic compounds.

The particular organic compounds which are oxygenated by the novel process of this invention are selected from the group consisting of compounds containing at least 1 carbon-carbon double bond with a total of 3 to 4 organic electron-donating moieties attached to the carbon atoms of said double bond, compounds with at least 2 conjugated carbon-carbon double bonds in cisoid configuration, and polycyclic aromatic compounds with at least 3 linearly-fused aromatic rings.

The novel process of this invention comprises mixing an organic compound of the above-defined group, hydrogen peroxide, and a positive halogen compound. The exact nature of the resulting product depends upon such factors as the nature of the organic reactant, the diluent if one is used, and the method of product isolation. Each substance produced by the novel process of this invention does, however, contain at least one more oxygen atom per molecule than the organic reactant. In most instances, the primary result of said process is the introduction of one or more peroxy moieties, —O$_2$—, into the organic reactant molecule. Usually, the peroxy compound is produced without loss of any atoms originally present in the organic reactant molecules, although, of course, those atoms may exist in a different structural arrangement after the reaction than before. The compound actually isolated is either the peroxy compound, for example, a hydroperoxy compound or a peroxide, or a transformation product thereof.

It is well-known to oxygenate organic compounds of the group defined hereinabove. In particular, such oxygenations have been effected with molecular oxygen in combination with light and, in many instances a small amount of a dyestuff photosensitizer, e.g., methylene blue or eosin. See, for example, Schönberg, "Präparative Organische Photochemie," Springer-Verlag, Berlin, pp. 47–73 (1958); Schenck, Angew. Chem., 69, 579–599 (1957); Bergmann et al., Chem. Rev. 28, 367–394 (1941); Bowen, "Advances in Photochemistry," Interscience Publishers, New York, vol. I, pp. 23ff. (1963). Substantial procedural problems exist in such light-sensitized reactions. For example, glass-walled reaction vessels must be used to transmit the light or the light source must be inside the reaction vessel. Further, such reactions are frequently difficult to control, do not proceed at a practical rate, require expensive equipment and energy, and give low yields of the desired product.

It is, of course, well known to subject organic compounds in great variety to the action of hydrogen peroxide or to the action of positive halogen compounds under a wide variety of conditions. Moreover, it is known to use the combination of hydrogen peroxide and certain positive halogen compounds, especially hypochlorites and hypochlorous acid either in combination or sequentially for bleaching purposes. See, for example, Paperi ja Puu, 39, 501–5, 508 (1957) [Chem. Abs., 52, 7694] and Ber. Deut. Chem., 65, 179–184 (1932). It was completely surprising and unexpected, however, that the group of organic compounds defined hereinabove could be oxygenated rapidly, efficiently, conveniently, and economically by interaction with the combination of hydrogen peroxide and one or more positive halogen compounds. It was even more surprising that useful oxygenated organic compounds could be isolated readily and in high yields from such reaction mixtures. Still more surprising was the discovery that the oxygenated organic compound or mixture of compounds so isolated is substantially identical with that obtained by the photochemical molecular oxygen oxygenation of the same organic reactant. Thus, the novel process of this invention provides a highly useful, advantageous, and economical alternate process for producing known oxygenated compounds heretofor producible only by photochemical processes.

The oxygenated organic compounds which can be produced by the novel process of this invention are useful for a wide variety of purposes. For example, when the usual primary peroxy product is isolated, it may be used as a catalyst in the polymerization of olefinic substances in the production of a wide variety of polymers, e.g., "cold rubber," in the bleaching of a wide variety of substances, e.g., resins, waxes, nylon, and cellulose acetate fibers, and especially as intermediates in the production of other useful organic substances. For example, it is well known to transform steroids within the scope of the organic reactants defined above via a photochemical oxygenation and a peroxy intermediate to other useful oxygenated steroids. The novel process of this invention can be used in place of the photochemical step in those steroid transformations.

As used hereinabove and hereinafter, an organic electron-donating moiety is one which contains at least one carbon atom and which increases the electron density in the environment of the atom to which said moiety is bonded relative to the electron density when a hydrogen atom is present in place of said moiety. Examples of electron-donating moieties are alkyl, alkenyl, cycloalkyl, cycloalkenyl, alkoxy, aryloxy, acyloxy, aryl, aralkyl, aralkenyl, and the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, and isomeric forms thereof. Examples of alkenyl are allyl, 1-methylallyl, 2-methylallyl(methylallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, 3-heptenyl, 4-octenyl, 10-dodecenyl, 9-octadecenyl, and the like. Examples of cycloalkyl are cyclopropyl, cyclobutyl, cyclopentyl, cyclohexyl, cycloheptyl, cyclooctyl, cyclononyl, cyclodecyl, and the like as well as bicyclic and tricyclic moieties which may be considered as having been derived by removal of a hydrogen atom from such bicyclic and tricyclic hydrocarbons as bicyclo[2.2.1]heptane, bicyclo[3.2.1]octane, decalin, bicyclo[2.2.2]octane, and perhydrophenanthrene. Examples of cycloalkenyl are 1-cyclopentenyl, 2-cyclopentenyl, 3-cyclopentenyl, 1-cyclohexenyl, 2-cyclohexenyl, 3-cyclohexenyl, 1-cycloheptenyl, 2-cycloheptenyl, 4-cycloheptenyl, 1-cyclooctenyl, 5-cyclodecenyl, and the like. Examples of alkoxy are methoxy, ethoxy, propoxy, butoxy, pentyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, and isomeric forms thereof. Examples of aryloxy are phenoxy, 1-naphthyloxy, 2-naphthyloxy, and the isomeric forms of diphenyloxy, terphenyloxy, phenanthryloxy, anthryloxy, acenaphthenyloxy, fluorenyloxy, pyrenyloxy, chrysenyloxy, naphthacenyloxy, and the like. Examples of acyloxy are acetoxy, propionyloxy, butyryloxy, valeroyloxy, hexanoyloxy, heptanoyloxy, octanoyloxy, decanoyloxy, lauroyloxy, acryloyloxy, crotonoyloxy, oleoyloxy, benzoyloxy, and the like. Examples of aryl are phenyl, 1-naphthyl, 2-naphthyl, and the isomeric forms of diphenyl, terphenyl, phenanthryl, anthryl, acenaphthenyl, fluorenyl, pyrenyl, chrysenyl, naphthacenyl, and the like. Examples of aralkyl are benzyl, phenethyl, 1-phenylethyl, 2-phenylpropyl, 3-phenylpropyl, 4-phenylbutyl, 10-phenyldecyl, 1-naphthylmethyl, 2-(2-naphthyl)propyl, 4-(9-anthryl)butyl, and the like. Examples of aralkenyl are 3-phenylallyl, 4-(1-naphthyl)-2-butenyl, 2-methyl-3-(4-phenanthryl)-5-hexenyl, and the like. It is to be understood that the electron-donating alkyl, alkenyl, cycloalkyl, cycloalkenyl, alkoxy, aryloxy, acyloxy, aryl, aralkyl, or aralkenyl moiety can also bear a great variety of organic and inorganic substituents including alkyl, alkenyl, cycloalkyl, cycloalkenyl alkoxy, aryloxy, acyloxy, aryl, aralkyl, and aralkenyl, all as exemplified above, as well as halo, e.g., fluoro, chloro, bromo, and iodo, alkoxycarbonyl, e.g., methoxycarbonyl, propoxycarbonyl, and nonyloxycarbonyl, nitro, cyano, cyanato, and the like, as long as the total moiety including any such substituents is electron-donating, as defined above. As will be apparent to those skilled in the art, certain substituted moieties, for example, trifluoromethyl, are not electron-donating and should be avoided as moieties. It is preferred that substituents and/or moieties reactive with hydrogen peroxide and/or positive halogen compounds not be present in organic reactants used in the novel process of this invention. Examples of such substituents and/or moieties are amino, substituted amino, mercapto, alkylthio, and the like. Organic reactants containing such substituents and/or moieties can however be oxygenated as defined above by the novel proces of this invention if they are otherwise as defined above and if the appropriately larger amounts of hydrogen peroxide and positive halogen compounds are used.

The term cisoid as used hereinabove and hereinafter in connection with organic reactants in the novel process of this invention refers to the spatial configuration of two carbon-carbon double bonds separated by a single carbon-carbon bond, i.e., a conjugated system. Cisoid and transoid conjugated double-single-double bond systems are defined and illustrated in Chem. Rev., 61, 540-2 (1961). In the novel process of this invention, when a compound with a conjugated double bond system is used as a reactant, it is usually necessary that said system be in the cisoid configuration as in cyclic dienes such as cyclopentadiene. Relatively simple acyclic conjugated dienes such as 1,3-butadiene are free to take either the cisoid or transoid configuration and, unless there are steric acid and/or electronic factors which keep the acyclic diene largely in the cisoid configuration, the acyclic diene will usually not be oxygenated in useful yields at a practical rate. Moreover, some cyclic dienes are not cisoid, e.g., 3-methylenecyclohexene, so the criterion is not that the diene be cyclic but that the conjugated double bond system be the predominately and, preferably, substantially exclusively in the cisoid form.

The term positive halogen compound as used hereinbefore and hereinafter refers to organic or inorganic compounds which contain chlorine, bromine, or iodine with a valence number +1. Such compounds usually contain a chlorine, bromine, or iodine atom bonded to some other atom, usually oxygen or nitrogen, in an inorganic or organic compound by a polar covalent bond wherein the halogen atom is the positive end of the dipole. Examples of inorganic positive halogen compounds are the hypohalous acids, e.g., hypochlorous acid and hypobromous acids, and the hypohalites, e.g., lithium, sodium, potassium, and calcium hypochlorites, hypobromites, and hypoiodites. Examples of organic positive halogen compounds are hypohalite esters, e.g., t-butyl hypochlorite, N-haloamides, e.g., N-chloroacetamide, N-bromoacetamide, N-bromobenzamide, N,p-dichloroacetanilide, and N-chloro-p-nitroacetanilide, the imides, e.g., N-chlorosuccinimide, N-bromosuccinimide, N-iodosuccinimide, N-chlorophthalimide, N-bromophthalimide, and other N-halo compounds, e.g., N-bromohydantoin, 1,3-dibromo-5,5-dimethylhydantoin, 1,3-dichloro-5,5-dimethylhydantoin, and the like.

In the novel process of this invention, preferred positive halogen compounds are the alkali metal and alkaline earth metal hypochlorites, and hypochlorous acid or its substantial equivalent, an aqueous solution of chlorine.

Although a wide variety of reactants with a tri-substituted or tetra-substituted carbon-carbon double bond can be used in the novel process of this invention, especially preferred are such reactants with the formula:

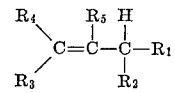

wherein $R_1$, $R_2$, $R_3$, $R_4$, and $R_5$ are selected from the group consisting of hydrogen and an electron-donating moiety bonded to C in said formula through an atom selected from the group consisting of oxygen and carbon, with the proviso that no more than one of $R_3$, $R_4$, and $R_5$ be hydrogen, and wherein any said moiety can be joined to any other said moiety to form a ring of carbon atoms including 1 to 3 of the C atoms in said formula. Any 2 or more of $R_1$, $R_2$, $R_3$, $R_4$, and $R_5$ can be alike, or all of them can be different. The term electron-donating moiety is used here as defined and exemplified hereinabove. As illustrative of the joining of moieties, $R_1$ and $R_2$ or $R_3$ and $R_4$ together with the C to which they are attached could be cyclohexyl; $R_4$ and $R_5$ together with the C to which each is attached could be cyclohexenyl; $R_2$ and $R_3$ together with the C to which each is attached could be cyclohexenyl. In the former two examples, the double bond would be exocyclic; in the latter two examples, the double bond would be endocyclic.

Further, although a wide variety of reactants with a cisoid conjugated double system can be used in the novel process of this invention, especially preferred are such cisoid reactants with the formula:

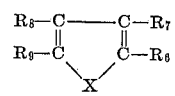

wherein $R_6$, $R_7$, $R_8$, and $R_9$ are selected from the group consisting of hydrogen and an organic electron-donating moiety bonded to C in said formula through an atom selected from the group consisting of oxygen and carbon, wherein X is selected from the group consisting of oxygen, $>C=O$, propenylene, and

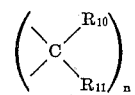

wherein $n$ is an integer at least 1 and wherein $R_{10}$ and $R_{11}$ are selected from the group consisting of hydrogen and an organic electron-donating moiety bonded to C through an atom selected from the group consisting of oxygen and carbon, and wherein any said moiety can be joined with any other said moiety to form a non-aromatic ring of atoms including 1 to 4 of the C atoms in said formula. Any 2 or more of $R_6$, $R_7$, $R_8$, and $R_9$ can be alike or all can be different. The term electron-donating moiety is used here as defined and exemplified hereinabove.

Still further, although a wide variety polycyclic aromatic compounds with at least 3 linearly-fused aromatic rings can be used as reactants in the novel process of this invention, especially preferred are reactants of the formula:

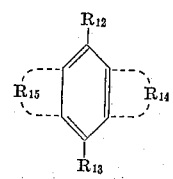

wherein $R_{12}$ and $R_{13}$ are selected from the group consisting of hydrogen and an organic electron-donating moiety bonded to the center ring of said formula through an atom selected from the group consisting of oxygen and carbon, and wherein $R_{14}$ and $R_{15}$ are each a divalent organic moiety which forms an aromatic ring in fusion with said center ring. $R_{12}$ and $R_{13}$ can be alike or different. $R_{14}$ and $R_{15}$ can be alike or different. The term electron-donating moiety is used here as defined and exemplified hereinabove.

The novel process of this invention is carried out by mixing the organic reactant to be oxygenated, hydrogen peroxide, and the positive halogen compound. The stoichiometry of the oxygenation is generally such that one mole of hydrogen peroxide and one equivalent of the positive halogen compound is required to add one peroxy moiety, —$O_2$—, to each mole of the organic reactant. It is usually preferred, however, to use about 1.5 to about 10 moles of hydrogen peroxide per mole of the organic reactant to be oxygenated. If it is desired to add more than one peroxy moiety to the organic reactant, for example to a reactant containing 2 cisoid conjugated double bond systems or 2 tri- or tetra-substituted carbon-carbon double bond systems, appropriately larger amounts of hydrogen peroxide and the positive halogen compound should be used.

The hydrogen peroxide and positive halogen compound can also interact to produce molecular oxygen. In the case of a few organic reactants which are oxygenated relatively slowly, part of the hydrogen peroxide may be transformed to molecular oxygen which will then escape from the reaction mixture. For that reason, it is advantageous to measure any possible evolution of molecular oxygen, for example, in a small scale preliminary oxygenation, so that the appropriately larger amount of hydrogen peroxide and positive halogen compound can be used in a subsequent larger scale oxygenation. Alternatively, oxygen evolution can be measured continuously, and additional compensatory amounts of hydrogen peroxide and positive halogen compound can be added during the course of the oxygenation.

In some instances, especially when the cost of the organic reactant is a small factor in the economics of the desired process, and when isolation of the desired product is facilitated thereby, it is advantageous to use less hydrogen peroxide and positive halogen compound than is necessary to oxygenate all of the organic reactant. The appropriateness of such an expedient in any particular oxygenation will be obvious to those skilled in the art. Further, it is often advantageous to use an excess of hydrogen peroxide over the amount of positive halogen compound to avoid undesired interaction of the organic reactant and/or the desired oxygenation product with the positive halogen compound. In such instances, it is usually advantageous to use about 1.5 to about 5 or even more moles of hydrogen peroxide per mole of the positive halogen compound.

The order of addition is not critical but it is usually preferred to mix the organic reactant to be oxygenated with the hydrogen peroxide, and then to add the positive halogen compound slowly in the form of an aqueous or non-aqueous solution.

The nature of the hydrogen peroxide is not critical, and satisfactory results are usually obtained by use of commercially-available 30% aqueous hydrogen peroxide. A more or less concentrated solution can be used but there is usually no advantage in doing so. Anhydrous hydrogen peroxide can be used when an anhydrous reaction mixture is desired, but ordinarily the presence of water is not detrimental.

Although any of the positive halogen compounds described and exemplified above can be used in the novel process of this invention, there is seldom any advantage in using other than an aqueous solution of an alkali metal or alkaline earth metal hypochlorite or an aqueous solution of hypochlorous acid. Such solutions are relatively inexpensive, easily prepared, and especially well suited to the novel oxygenations of this invention. Aqueous sodium hypochlorite solutions are especially preferred. The concentration of the hypochlorite or hypochlorous acid is not critical and aqueous hypochlorite solutions in the range about 0.1 to about 2 molar or hypochlorous acid solutions obtained by saturating water at about 20° to 30° C. with chlorine gas generally give satisfactory results. An advantageous alternative to the use of separate hydrogen peroxide and hypochlorous solutions is the use of an aqueous hydrogen peroxide solution to which the appropriate amount of chlorine gas is added.

The pH of the reaction mixture is not critical and a pH in the range about 2 to about 10 usually gives satisfactory results.

When the organic reactant to be oxygenated is sufficiently soluble in water, there is no need to use a reaction diluent other than the water present in the hydrogen peroxide and/or with the positive halogen compound. If the organic reactant is not sufficiently soluble in water, it is preferred to use a water-miscible organic diluent to give a homogeneous reaction mixture. Suitable organic diluents are those which will permit such homogeneity, which will not react to any substantial extent with the organic reactant, the hydrogen peroxide, and/or the positive halogen compound, and which will not interfere with the isolation of the desired oxygenation product. Examples of generally useful diluents are lower alkanols, e.g., methanol, ethanol, propanol and isopropyl alcohol; dioxane, dimethylformamide, alkylene glycols, e.g., ethylene glycol and diethylene glycol, and the monoalkyl ethers thereof. In some instances, it is desired that the diluent react with the primary peroxy compound so that some other preferred secondary product is formed.

When the solubility characters of the organic reactant are such that a homogeneous reaction mixture is not feasible or a positive halogen compound other than inorganic hypochlorites or hypochlorous acid is used, it is sometimes advantageous to use a water-immiscible diluent. A two-phase reaction mixture will then result unless anhydrous hydrogen peroxide is used. Thorough mixing of such a two-phase reaction mixture is essential to allow contact among the various reacting species. Examples of suitable water-immiscible diluents are benzene, chlorobenzene, carbon tetrachloride, dichloromethane, chloroform, carbon disulfide, anisole, and the like.

A reaction temperature in the range about 20° to about 30° C. (room temperature) usually results in satisfactory oxygenation, although there is sometimes advantage in lowering the reaction temperature to about 0° C. to about 10° C. or even lower. The rate of the novel process of this invention is substantially independent of temperature and, accordingly, there is ordinarily no advantage in raising the reaction temperature above room temperature. Indeed, there may be actually disadvantage in doing that because the rate of production and evolution of molecular oxygen increases rapidly with an increase in temperature. As pointed out above, production and evolution of molecular oxygen is usually undesirable in the novel oxygenations of this invention.

The novel oxygenations of this invention usually proceed rapidly and in most cases are complete within a few minutes after mixing of the organic reactant, the hydrogen peroxide, and the positive halogen compound. In a few instances, the oxygenation may require up to about 5 or even more hours. In those instances, it is usually preferred to use a somewhat greater excess of hydrogen peroxide and positive halogen compound than is used in the faster oxygenations.

The oxygenation products produced according to this invention can be isolated by methods known to be useful in the isolation of products obtained by the prior art photochemical oxygenations. In many instances, it is preferred not to isolate an intermediate primary peroxy but rather to transform that product in situ to some other oxygenated product. For example, a hydroperoxy compound can often be transformed by reduction, e.g., with sodium borohydride or by catalytic hydrogenation, to the corresponding hydroxy compound. Peroxy compounds can also be transformed to other compounds, e.g., dioxides, by reaction with mineral acids, or to chloro or bromo compounds by reaction with hydrochloric or hydrobromic acids, respectively.

The novel process of this invention can be more fully understood by the following examples.

*Example 1.—Oxygenation of 2,3-dimethyl-2-butene*

Hydrogen peroxide (30% aqueous; 19.2 ml.; 180 mmole) was added to a solution of 2,3-dimethyl-2-butene (5.05 g.; 60 mmole) in 300 ml. of methanol. The resulting solution was stirred at 10° C., and 145.5 ml. of an aqueous sodium hypochlorite solution (1.03 molar; 150 meq.) was added during about 90 minutes. The resulting mixture was then diluted with water and extracted with diethyl ether. The ether extract was dried and the ether was removed by distillation. The residue was then distilled at reduced pressure to give 4.39 g. of 2,3-dimethyl-3-hydroperoxy-1-butene; B.P. 54° C. at 9 mm., $n_D^{24.5}$ 1.4408. The infrared and n.m.r. spectra of this product were substantially identical with the spectra of the product produced by Schenck et al. (Ann., 618, 185 (1958)) by a dye-sensitized photochemical oxygenation of the same reactant.

Following the above procedure but using separately in place of the aqueous sodium hydrochlorite solution, aqueous solutions of potassium hypochlorite, sodium hypobromite, and sodium hypoiodite, a stream of chlorine gas, and an aqueous solution chlorine gas (hypochlorous acid), the same product was obtained.

*Example 2.—Oxygenation of limonene*

Following the procedure of Example 1, limonene was reacted with hydrogen peroxide and sodium hypochlorite to give a hydroperoxide substantially identical to that obtained by Schenck et al. [Ann., 674, 93 (1964)] by photochemical oxygenation of limonene.

*Example 3.—Oxygenation of 9,10-octalin
(1,2,3,4,5,6,7,8-octahydronaphthalene)*

Following the procedure of Example 1, 9,10-octalin was reacted with hydrogen peroxide and sodium hypochlorite to give an octalin hydroperoxide substantially identical with that obtained by Schenck et al. [Angew. Chem., 69, 592 (1957)] by photochemical oxygenation of 9,10-octalin.

*Example 4.—Oxygenation of 1,2-dimethyl-1-cyclohexene*

Following the procedure of Example 1, 1,2-dimethyl-1-cyclohexene was reacted with hydrogen peroxide and sodium hypochlorite to give a hydroperoxide.

Also following the procedure of example 1, 2,3-diphenyl-2-butene, 2,3-(di-p-anisyl)-2-pentene, 1,1-diphenyl-2-methyl-1-propene, 1-phenyl-2-methyl-1-propene, triphenylbenzylethylene, 8-methyl-2,6-octadien-1-ol, methyl 3-methyl-3-pentenoate, 4-chloro-1,2-dimethyl-1-cyclohexene, and 2,2-dimethyl-3-isopropylidencyclopropyl propionate are each reacted with hydrogen peroxide and sodium hypochlorite to give a hydroperoxide.

*Example 5.—Oxygenation of α-pinene*

Following the procedure of Example 1, α-pinene was reacted with hydrogen peroxide and sodium hypochlorite to give a hydroperoxide.

Also following the procedure of Example 1, ocimene, alloocimene, myrcene, $\Delta^3$-carene, dipentene, terpinolene, geraniol, nerol, linalool, citronellol, citronellal, α-terpineol, carvone, citral, α-ionone, β-ionone, pseudoinone, farnesol, nerolidol, bisabolene, and abietic acid are each transformed to a hydroperoxide or mixture of hydroperoxide. In those instances wherein 2 tri- or tetrasubstituted double bonds are present, e.g., in terpinolene, a second hydroperoxy group is introduced when sufficient hydrogen peroxide and sodium hypochlorite are used. Further, in some instances, for example, when an easily oxidizable moiety such as an aldehyde group is present as in citral, that moiety is oxidized.

*Example 6.—Oxygenation of chloesterol*

Following the procedure of Example 1, cholesterol was reacted with hydrogen peroxide and sodium hypochlorite to give 3-β-hydroxy-$\Delta^6$-cholesten -5α-hydroperoxide.

*Example 7.—Oxygenation of stigmasteryl acetate*

Following the procedure of example, stigmasteryl acetate was reacted with hydrogen peroxide and sodium hypochlorite to give $\Delta^{6,22}$-stigmastadien-3β-acetoxy-5α-hydroperoxide.

*Example 8.—Oxygenation of $\Delta^5$-pregnen-3β-ol-20-one*

Following the procedure of Example 1, $\Delta^5$-pregnen-3β-ol-20-one was reacted with hydrogen peroxide and sodium hypochlorite to give $\Delta^6$-allopregnen-3β-ol-20-one-5-hydroperoxide. That hydroperoxide is transformed to the corresponding 5-hydroxy compound on treatment with hydrogen in the presence of Raney nickel.

Also following the procedure of Example 1, $\Delta^5$-androsten-3β-acetoxy-17-one, 16-dehydropregnenolon-acetate, sitosterol acetate, 7-dehydroandrosteron-3-acetate, cholesteryl benzoate, cholesteryl acetate, $\Delta^5$-cholestenone-3, $\Delta^{3,5}$-cholestadiene, cholesteryl chloride, $\Delta^7$-ergostenol, $\Delta^{14}$-ergostenol, $\Delta^8$-ergostenol, 5-dehydroergostenol, $\Delta^7$-cholestenyl acetate, β-amyrin, $\Delta^5$-pregnene-3β-ol-20-one acetate, diosgenin, and botogenin are each transformed to a hydroperoxide.

*Example 9.—Oxygenation of 2,5-dimethyl-furan*

Hydrogen peroxide (30% aqueous, 3.0 ml., 27.5 mmole) was added to a solution of 2,5-dimethylfuran (3.01 g.; 31.2 mmole) in 250 ml. of methanol at 5° C. The resulting solution was then stirred at the same temperature, and 21 ml. of an aqueous sodium hypochlorite solution (0.67 molar; 14.1 mmoles) was added dropwise during 10 minutes. The resulting mixture was then evaporated under reduced pressure at about 0° C. to a 20-ml. volume. Ice was added to that residue and the mixture was extracted three times with 30-ml. portions of diethyl ether. The ether extracts were combined and evaporated to give 2.4 g' of a residue which was recrystallized from diethyl ether to give 1.89 g. of 2,5-dimethyl-2-hydroperoxy-5-methoxydihydrofuran; M.P. 75–77° C.

*Analysis.*—Found: C, 52.42; H, 7.45; $OCH_3$, 18.83; mol. wt. 177.3 (osmometer).

N.m.r. ($CDCl_3$): 0.78, 3.98, 6.64, 8.42, 8.47τ (all sharp singlets, relative areas 1:2:3:3:3, assigned to OOH, olefinic H, $OCH_3$, C—$CH_3$ and C—$CH_3$ respectively).

IR ($CCl_4$, 0.005 M): 3512 cm.$^{-1}$ (OOH).

IR ($CHCl_3$; principal bands): 7.26, 7.40, 7.80, 8.16, 8.52, 8.66, 8.88, 9.12, 9.42, 9.56, 10.44, 11.30, 11.50μ.

*Example 10.—Oxygenation of 2,5-diphenylfuran*

Following the procedure of Example 9, 2,5-diphenylfuran was reacted with hydrogen peroxide and sodium hypochlorite to give cis-dibenzoylethylene.

*Example 11.—Oxygenation of tetraphenylcyclopentadienone*

Hydrogen peroxide (30% aqueous; 5.0 ml.; 44 mmole) was added to a solution of tetraphenylcyclopentadienone (0.17 g.; 0.44 mmole) in 125 ml. of dioxane. The resulting solution was stirred and 32.8 ml. of an aqueous sodium hypochlorite solution (0.67 molar; 22 mmoles) was added dropwise. The resulting 2-phase reaction mixture was lightly colored. The phases were separated, and the dioxane phase was diluted with water and extracted four times with 40-ml. portions of benzene. The combined benzene extracts were washed with water, dried with magnesium sulfate, and evaporated. The resulting residue was recrystallized from ethanol to give 0.88 g. of cis-dibenzoylstilbene; M.P. 215.9–216.3° C. The same product is obtained by the dye-sensitized photochemical oxygenation of tetraphenylcyclopentadienone [J. Am. Chem. Soc. 84, 1261 (1962)]. The peroxide intermediate was not isolated.

*Example 12.—Oxygenation of 1,3-cyclohexadiene*

Hydrogen peroxide (30% aqueous; 25.6 ml.; 240 mmole) was added to a solution of 1,3-cyclohexadiene (3.21 g.; 40 mmole) in 250 ml. of methanol at −5° C. The resulting solution was stirred and, with continued cooling, 168 ml. of an aqueous sodium hypochlorite solution (0.89 molar) was added dropwise during 2 hours. Measurement of molecular oxygen which was evolved indicated that about 32 mmole of oxygen was taken up by the 1,3-cyclohexadiene. The reaction mixture was then diluted with 800 ml. of water and extracted four times with 300-ml. portions of diethyl ether. The combined ether extracts were washed successively with water and saturated aqueous sodium chloride solution, and were then dried with magnesium sulfate and evaporated under reduced pressure. The oily residue was distilled (bulb to bulb) under high vacuum (about 1 micron) to give 0.88 g. of 5,6-dioxabicyclo[2.2.2]-oct-2-ene. The infrared and n.m.r. spectra of that product were substantially identical with those reported for the product obtained by dye-sensitized photochemical oxygenation of 1,3,-cyclohexadiene [Houben-Weyl, "Die Methoden der Organischen Chemi," Georg Thieme Verlag, Stuttgart, 4th ed., vol. VIII, p. 16 (1952)].

N.m.r. ($CCl_4$): $3.43\tau$ (overlapping doublets), $5.47\tau$ (broad peak), $8.26\tau$ (center of multiplet) in ratio 1:1:2, assigned to vinylic, bridgehead and methylene protons respectively.

IR ($CCl_4$) principal bands: 7.28, 8.25, 8.60, 9.50, 10.40, 10.80, 13.80, 14.60$\mu$.

*Example 13.—Oxygenation of α-terpinene*

Following the procedure of example 12, α-terpinene was reacted with hydrogen peroxide and sodium hypochlorite to give ascaridole.

*Example 14.—Oxygenation of 1,2-dimethyl-3,5-cyclohexadiene-1,2-dicarboxylic anhydride*

Following the procedure of Example 12, 1,2-dimethyl-3,5-cyclohexadiene-1,2-dicarboxylic anhydride was reacted with hydrogen peroxide and sodium hypochlorite to give a peroxy compound substantially identical with that reported by Schenck et al. [Naturwiss, 40, 581 (1953)].

Also following the procedure of Example 12, α-phellandrene, zingiberene, levopimaric acid, ethyl norcaradiencarboxylate, azulene, and cycloheptatriene are transformed to transannular peroxy compounds.

*Example 15.—Oxygenation of ergosterol*

Following the procedure of Example 12, ergosterol was reacted with hydrogen peroxide and sodium hypochlorite to give an ergosterol peroxide substantially the same as that obtained by the eosin-sensitized photochemical oxygenation of ergosterol.

*Example 16.—Oxygenation of $\Delta^{2,4}$-cholestadiene*

Following the procedure of Example 12, $\Delta^{2,4}$-cholestadiene was reacted with hydrogen peroxide and sodium hypochlorite to give a transannular peroxide substantially the same as that obtained by the eosin-sensitized photochemical oxygenation of $\Delta^{2,4}$-cholestadiene.

Also following the procedure of Example 12, dehydroergosterol, 22 - dihydroergosterol, 7 - dehydrocholesterol, 5,7-androstadienediol, lumisterol, dehydroergosteryl acetate, and isodehydrocholesterol are transformed to perxoy compounds.

In each instance, the same product is obtained by using hypochlorous acid in place of the sodium hypochlorite.

*Example 17.—Oxygenation of rubrene*

Following the procedure of Example 12, rubrene was reacted with hydrogen peroxide and sodium hypochlorite to give a rubrene peroxide with substantially the same properties as the peroxide obtained by photochemical oxygenation of rubrene.

Following the procedure of Example 17 but using in place of sodium hypochlorite, a chlorobenzene solution of N-chlorosuccinimide, the same rubrene peroxide was used. When N-bromosuccinimide, N-bromophthalimide, and 1,3-dichloro-5,5-dimethylhydantoin are used in place of N-chlorosuccinimide, the same rubrene peroxide is obtained.

Following the procedure of Example 17, anthracene, 9,10-diphenylanthracene, 9,10 - diphenyl - 2 - methoxyanthracene, 9,10-diphenylnaphthacene, meso - diphenylhelianthrene, heterocoerdianthrone, pentacene, naphthacene, 9,10-dimethyl - 1,2 - benzanthracene, 5,11 - diphenylnaphthacene, 5,11-di(p - bromophenyl) - 6,12 - diphenylnaphthacene, 5,11-di(p-methoxyphenyl)-6,12 - diphenylnaphthacene, 5,6,12-triphenyl-11-carbethoxynaphthacene, and 9-phenyl-10-cyclohexylanthracene, are each transformed to a transannular peroxide.

We claim:
1. A process for oxygenating an organic compound selected from the group consisting of compounds containing at least 1 carbon-carbon double bond with a total of 3 to 4 organic electron-donating moieties attached to the carbon atoms of said double bond, compounds with at least 2 conjugated carbon-carbon double bonds in cis-oid configuration, and polycyclic aromatic compounds with at least 3 linearly-fused aromatic rings, which comprises mixing said organic compound, hydrogen peroxide, and a positive halogen compound, and subsequently isolating an organic product containing additional chemically-bonded oxygen.

2. The process of claim 1 wherein said positive halogen compound is selected from the group consisting of hypochlorous acid, alkali metal hypochlorites, and alkaline earth metal hypochlorites, and wherein said mixing is carried out in the presence of water.

3. A process of oxygenating a compound of the formula:

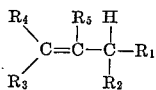

wherein $R_1$, $R_2$, $R_3$, $R_4$, and $R_5$ are selected from the group consisting of hydrogen and an organic electron-donating moiety bonded to C in said formula through an atom selected from the group consisting of oxygen and carbon, with the proviso that no more than one of $R_3$, $R_4$, and $R_5$ be hydrogen, and wherein any said moiety can be joined with any other said moiety to form a ring of atoms including 1 to 3 of the C atoms in said formula, which comprises mixing said organic compound, hydrogen peroxide, and a positive halogen compound, and subsequently isolating an organic product containing additional chemically-bonded oxygen.

4. The process of claim 3 wherein said positive halogen compound is selected from the group consisting of hypochlorous acid, alkali metal hypochlorites, and alkaline earth metal hypochlorites, and wherein said mixing is carried out in the presence of water.

5. The process of claim 3 wherein the compound of said formula is a terpene.

6. The process of claim 3 wherein the compound of said formula is a steroid.

7. A process for oxygenating a cisoid compound of the formula:

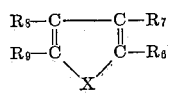

wherein $R_6$, $R_7$, $R_8$, and $R_9$ are selected from the group consisting of hydrogen and an organic electron-donating moiety bonded to C in said formula through an atom selected from the group consisting of oxygen and carbon, wherein X is selected from the group consisting of oxygen, $>C=O$, propenylene, and

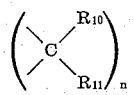

wherein $n$ is an integer at least 1 and wherein $R_{10}$ and $R_{11}$ are selected from the group consisting of hydrogen and an organic electron-donating moiety bonded to C through an atom selected from the group consisting of oxygen and carbon, and wherein any said moiety can be joined with any other said moiety to form a non-aromatic ring of atoms including 1 to 4 of the C atoms in said formula, which comprises mixing said organic compound, hydrogen peroxide, and a positive halogen compound, and subsequently isolating an organic product containing additional chemically-bonded oxygen.

8. The process of claim 7 wherein said positive halogen compound is selected from the group consisting of hypochlorous acid, alkali metal hypochlorites, and alkaline earth metal hypochlorites, and wherein said mixing is carried out in the presence of water.

9. The process of claim 7 wherein the compound of said formula is a terpene.

10. The process of claim 7 wherein the compound of said formula is a steroid.

11. A process for oxygenating a compound of the formula

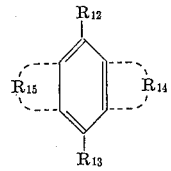

wherein $R_{12}$ and $R_{13}$ are selected from the group consisting of hydrogen and an organic electron-donating moiety bonded to the center ring of said formula through an atom selected from the group consisting of oxygen and carbon, and wherein $R_{14}$ and $R_{15}$ are each a divalent organic moiety which forms an aromatic ring in fusion with said center ring, which comprises mixing said organic compound, hydrogen peroxide, and a positive halogen compound, and subsequently isolating an organic product containing additional chemically-bonded oxygen.

12. The process of claim 11 wherein said positive halogen compound is selected from the group consisting of hypochlorous acid, alkali metal hypochlorites, and alkaline earth metal hypochlorites, and wherein said mixing is carried out in the presence of water.

No references cited.

LEWIS GOTTS, *Primary Examiner.*

HENRY A. FRENCH, *Assistant Examiner.*